US006980431B1

(12) United States Patent
Shih-Tsung

(10) Patent No.: US 6,980,431 B1
(45) Date of Patent: Dec. 27, 2005

(54) CONTROLLING DEVICE FOR CONTROLLING SLOT SHUTTER

(75) Inventor: Chen Shih-Tsung, Taipei (TW)

(73) Assignee: Shuttle Inc., Taipei (TW)

( * ) Notice: Subject to any disclaimer, the term of this patent is extended or adjusted under 35 U.S.C. 154(b) by 19 days.

(21) Appl. No.: 10/878,997

(22) Filed: Jun. 30, 2004

(51) Int. Cl.$^7$ ................................................ G06F 1/16
(52) U.S. Cl. ....................... 361/685; 369/77.1; 720/734
(58) Field of Search ............................... 369/77.1, 77.2, 369/77.5, 187–188; 720/616, 628, 734, 620; 361/679–687, 361/724–727; 206/309, 425

(56) References Cited

U.S. PATENT DOCUMENTS

| | | | | |
|---|---|---|---|---|
| 5,793,714 A | * | 8/1998 | Inoue et al. | 369/30.34 |
| 6,473,260 B1 | * | 10/2002 | Seo et al. | 720/616 |
| 6,874,153 B2 | * | 3/2005 | Kabasawa | 720/623 |
| 2001/0030137 A1 | * | 10/2001 | Ishii et al. | 206/308.1 |
| 2003/0179661 A1 | * | 9/2003 | Sato et al. | 369/30.68 |

* cited by examiner

Primary Examiner—Hung Van Duong

(57) ABSTRACT

A controlling device for controlling a slot shutter of a slot in a computer casing is provided for the user to operate easily and conveniently. The device includes a panel with the slot shutter, an operating button disposed on the panel and peripheral to the slot shutter, a link component disposed at an inner side of the panel and having a first end corresponding to the operating button and a second end corresponding to a tray controlling button, and a resilient member disposed on the link component for providing a resilience for the operating button. When the operating button is pressed, which generates a flexible location shift of the link component due to a flexibility thereof, the tray controlling button is compressed by the link component, such that the purpose of connectedly operating the tray controlling button through the operating button is accomplished. Accordingly, the operating button can be disposed at a position where is convenient for operating.

9 Claims, 6 Drawing Sheets

CONTROLLING DEVICE FOR CONTROLLING SLOT SHUTTER

BACKGROUND OF THE INVENTION

The present invention is related to a controlling device for controlling a slot shutter of a slot in a computer casing, and more particularly, to a controlling device for controlling a slot shutter of a slot in a computer casing without being delimited by the spacially relative operating positions of the disk cartridge and the operating button, but through a link component to control the operation. The operating button can be disposed adjacent to the slot shutter, where is easy for operating, such that the tray can slide in and out when the controlling button is compressed by the link component through pressing the operating button.

In the conventional computer casing, the slots provided for installing the peripheral equipments like DVD, VCD, combo player, and CD burner therein are often designed for open allocation. That is, when installing the above-mentioned multimedia equipments in the slot, it is necessary to remove the outer veneer board which seals the slot. After the installing is accomplished, the multimedia equipments can be operated by directly pressing the exposed tray controlling button which controls the tray of the disk cartridge sliding in and out.

However, with the computer casing developing towards a more diverse and delicate trend, the appearance of the computer casing is not invariable anymore. In order to let the computer casing own a decorative feature, not only the computer casing is miniaturized and the appearance is designed diversely, but also the entire visual effect and the beautification feature of the panel are emphasized. Therefore, a slot shutter is installed at each corresponding slot opening, which simultaneously opens and shuts with the sliding out and in of the tray of the multimedia equipment. Besides, since the tray controlling button of the multimedia equipment is covered up by the slot shutter, the tray can not be controlled by directly pressing the exposed tray controlling button as that in the conventional art. It becomes necessary to control the tray controlling button of the multimedia equipment with an indirectly way. That is, the tray controlling button is controlled by the operating button disposed on the panel and adjacent to the slot shutter. The operating button is at the position corresponding to the tray controlling button and is able to directly compress the tray controlling button when an external force is applied thereon. Accordingly, the tray of the multimedia equipment slides in and out under the control of the operating button on the panel.

Presently, the widely used allocating position for the operating button is the location on the panel where corresponds to the tray controlling button of the multimedia equipment so that the tray controlling button can be operated connectedly with the operating of the operating button. However, the tray controlling buttons of the multimedia equipments in the market now are mostly located under the slot opening where the tray slides through. When the tray slides out, the tray controlling button is spacially covered by the tray. Traditionally, the problem of pressing the tray controlling button spacially covered by the tray to make the tray slide in has existed. Therefore, some users directly push the tray into the slot of the multimedia equipment by hands. Nevertheless, under the present design that the above-mentioned slot shutter is further installed, the operating button will be spacially covered by both the tray and the slot shutter when the tray slides out. Similarly, it is difficult to operate the operating button to make the tray slide in due to the spacial limitation. Again, it is very common that users directly push the tray into the slot of the multimedia equipment by hands. Meanwhile, the slot shutter will shut up simultaneously. However, pushing the tray back by hands to force the tray slide in is not a normal means to operate the multimedia equipment, which will easily cause component damages if the tray is always forced to slide in the slot. Despite there is operational difficulty existed in the conventional art, none of improved technique or means has been disclosed. Therefore, there is a substantial need to provide a controlling device for controlling a slot shutter that resolves the above drawbacks in the prior art.

SUMMARY OF THE INVENTION

The present invention is to resolve the operational drawbacks caused by the corresponding positions between the operating button and the tray that it is hard to make the tray slide back into the slot and to make the slot shutter shut up through the operating button covered by the sliding-out tray.

The present invention is to provide a controlling device for controlling a slot shutter of a slot in a computer casing. A link component is disclosed in the present invention for providing a flexible link between two distance components, the operating button and the tray controlling button. That is, the tray controlling button can be control by operating the operating button. As such, the operating button can be disposed at the lateral side of the slot shutter on the panel or above the slot shutter. The user can easily operate the operating button to control the tray sliding in or out without the spacial limitations that the operating button is covered by the tray and the slot shutter.

According to a purpose of the present invention, a controlling device for controlling a slot shutter of a slot in a computer casing, which can be operated easily and conveniently, is provided. In addition, the operating button is disposed at the lateral side of the slot shutter or above the slot shutter on the computer casing panel. The two ends of the flexible link component are assembled correspondingly to the operating button and the tray controlling button respectively so as to link their operations in response to the control from the operating button so that the tray can slide out and in.

According to one aspect of the present invention, a controlling device for controlling a slot shutter of a slot in a computer casing is disclosed. In one preferred embodiment, the controlling device includes:

a panel with the slot shutter;

an operating button disposed on the panel and peripheral to the slot shutter;

a link component disposed at an inner side of the panel and having a first end corresponding to the operating button and a second end corresponding to a tray controlling button; and a resilient member disposed on the link component for providing a resilience for the operating button;

thereby when the operating button is pressed, which generates a flexible location shift of the link component due to a flexibility thereof, the tray controlling button is compressed by the link component, such that the purpose of connectedly operating the tray controlling button through the operating button is accomplished. Further, it can be operated easily and conveniently without spacial limitation.

The foregoing and other features and advantages of the present invention will be more clearly understood through the following descriptions with reference to the drawings, wherein:

DETAILED DESCRIPTION OF THE PREFERRED EMBODIMENT

Figure 1:
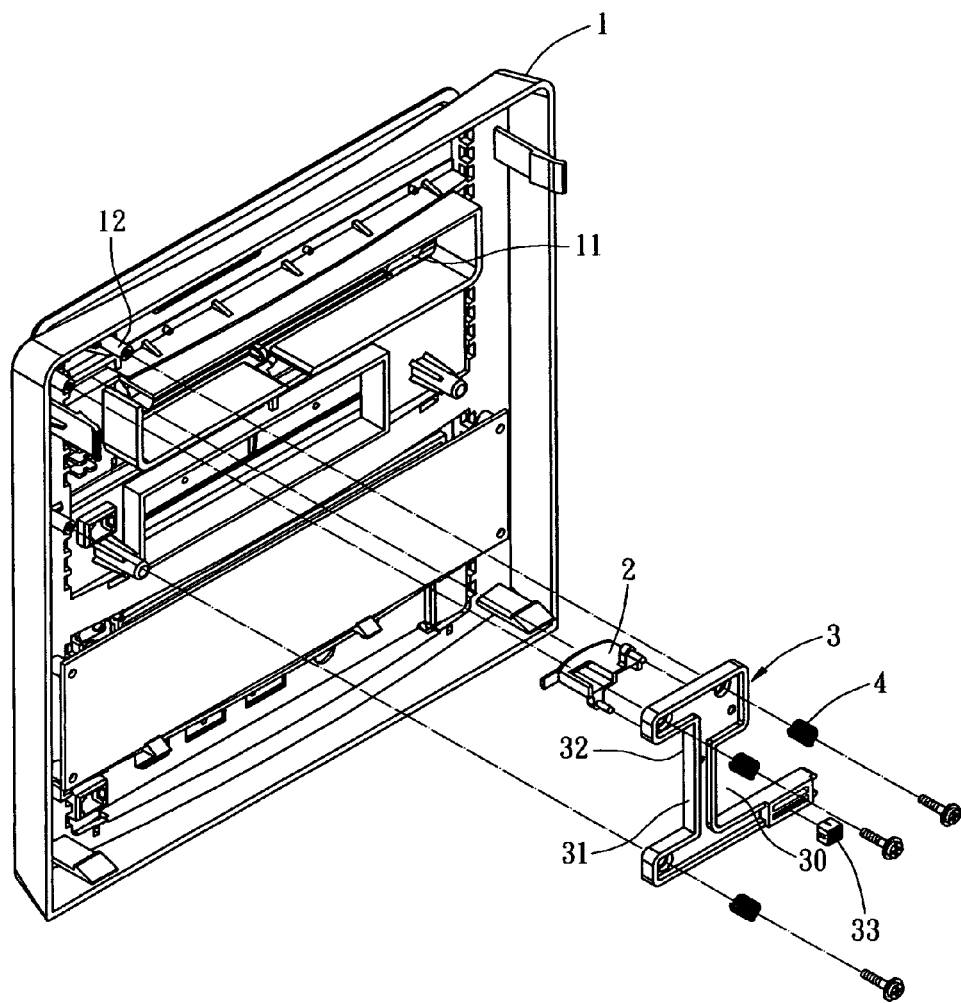
FIG. 1 is an exploded view of the structure of the link component and the computer casing panel according to one preferred embodiment of the present invention.

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Please refer to FIGS. 1–4, which are diagrams showing the assembled structure of the link component and the computer casing panel according to one preferred embodiment of the present invention. In this preferred embodiment, a controlling device for controlling a slot shutter of a slot in a computer casing is disclosed, which can be easily operated by the user without the spacial limitations that the operating button is covered by the tray and the slot shutter. The device includes a panel 1 with the slot shutter 11, an operating button 2 disposed on the panel 1, a link component 3 for linking the operations in response to the control from an exterior so as to control a tray controlling button 52, and a resilient member 4 for providing a resilience for the operating button 2.

The panel 1 is fixedly assembled on the front side of the computer casing 6. A slot shutter 11 is installed on the panel 1 where corresponds to each slot 61 of the computer casing 6. The slot shutter 11 simultaneously opens and shuts under the control with the sliding out and in of the tray 51 of the multimedia equipment 5.

Figure 2:
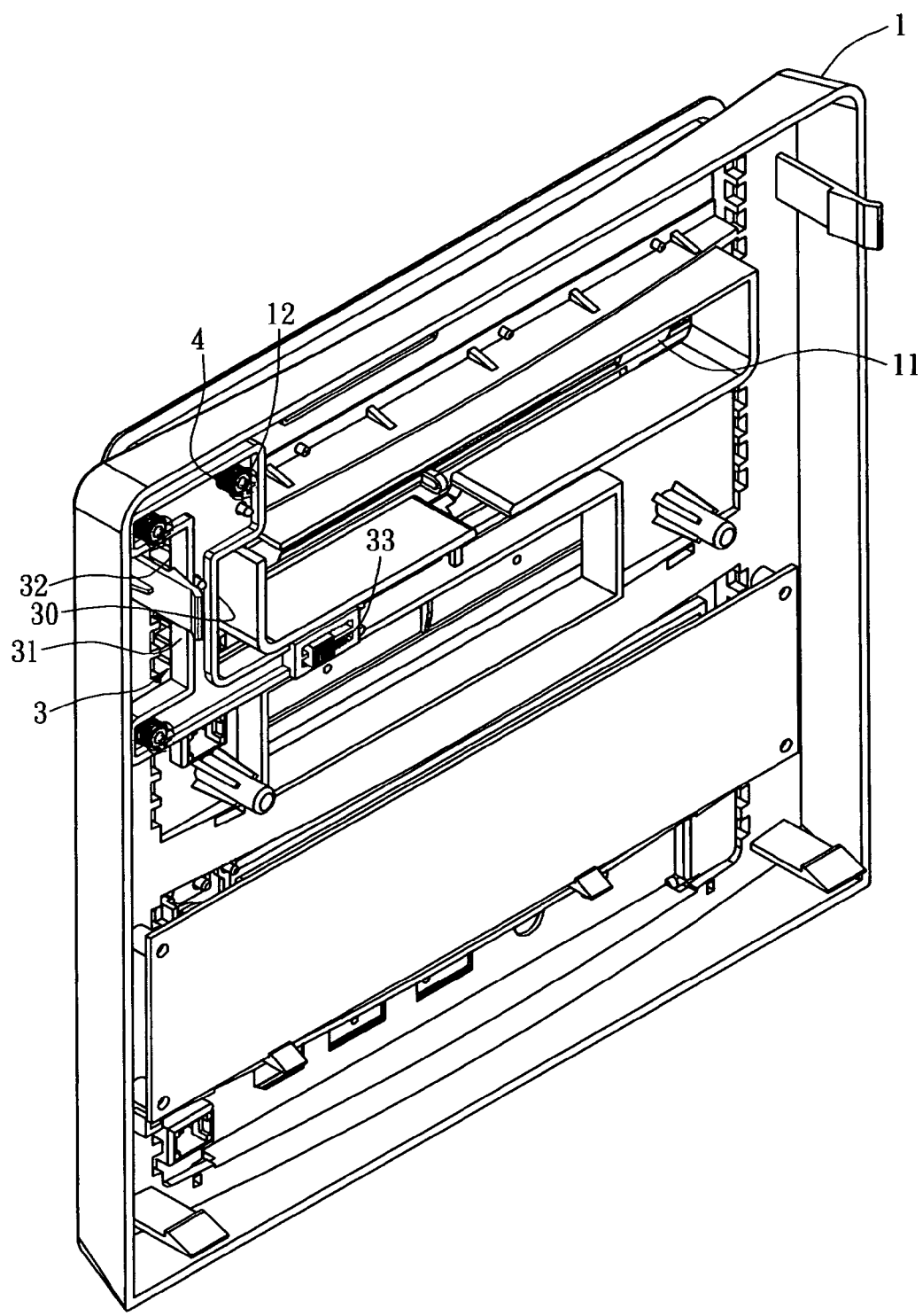
FIG. 2 is a diagram showing the assembled structure of the link component and the computer casing panel according to one preferred embodiment of the present invention.
Figure 3:
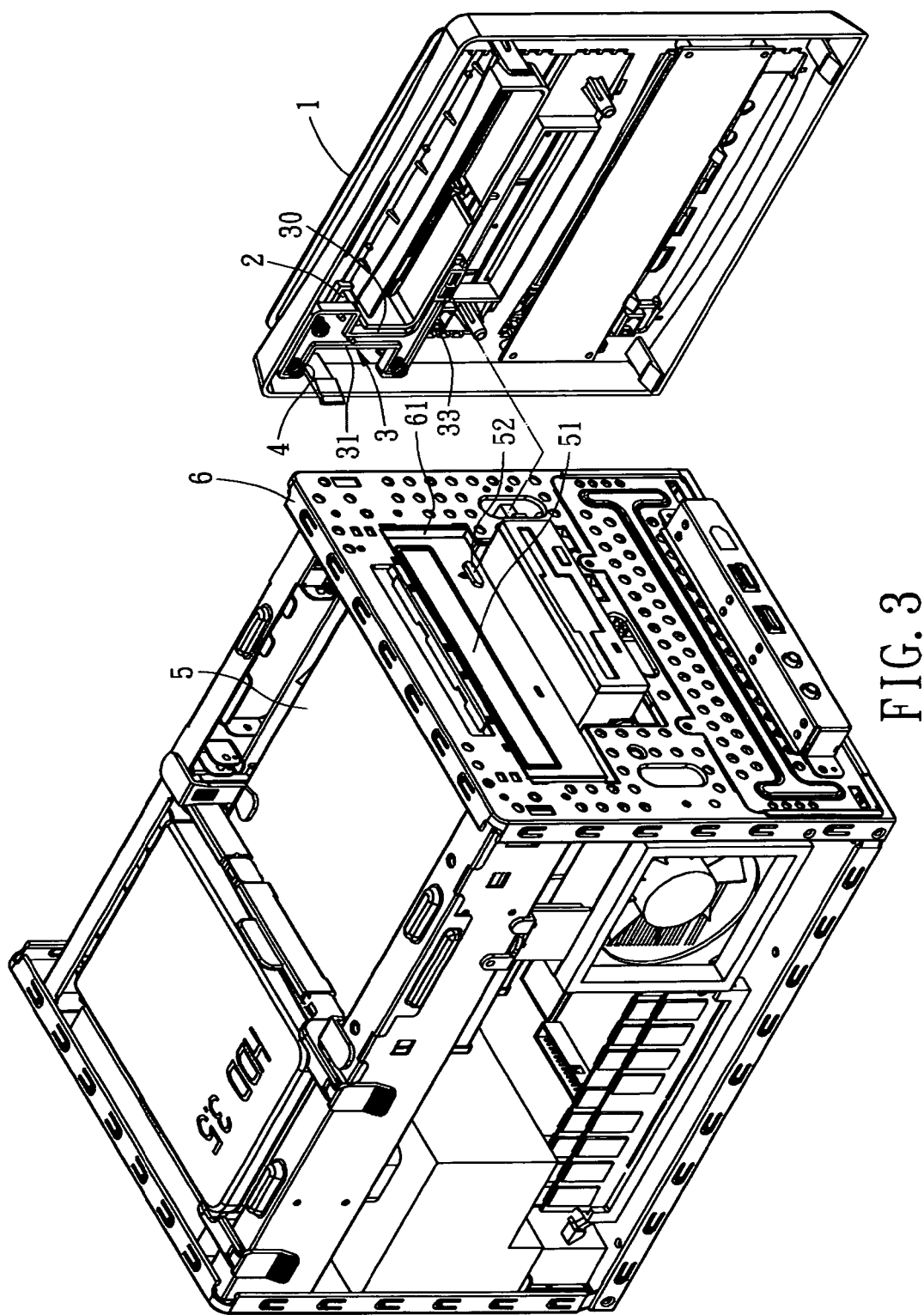
FIG. 3 is a diagram showing the assembled structure combined with the computer casing according to one preferred embodiment of the present invention.
Figure 4:
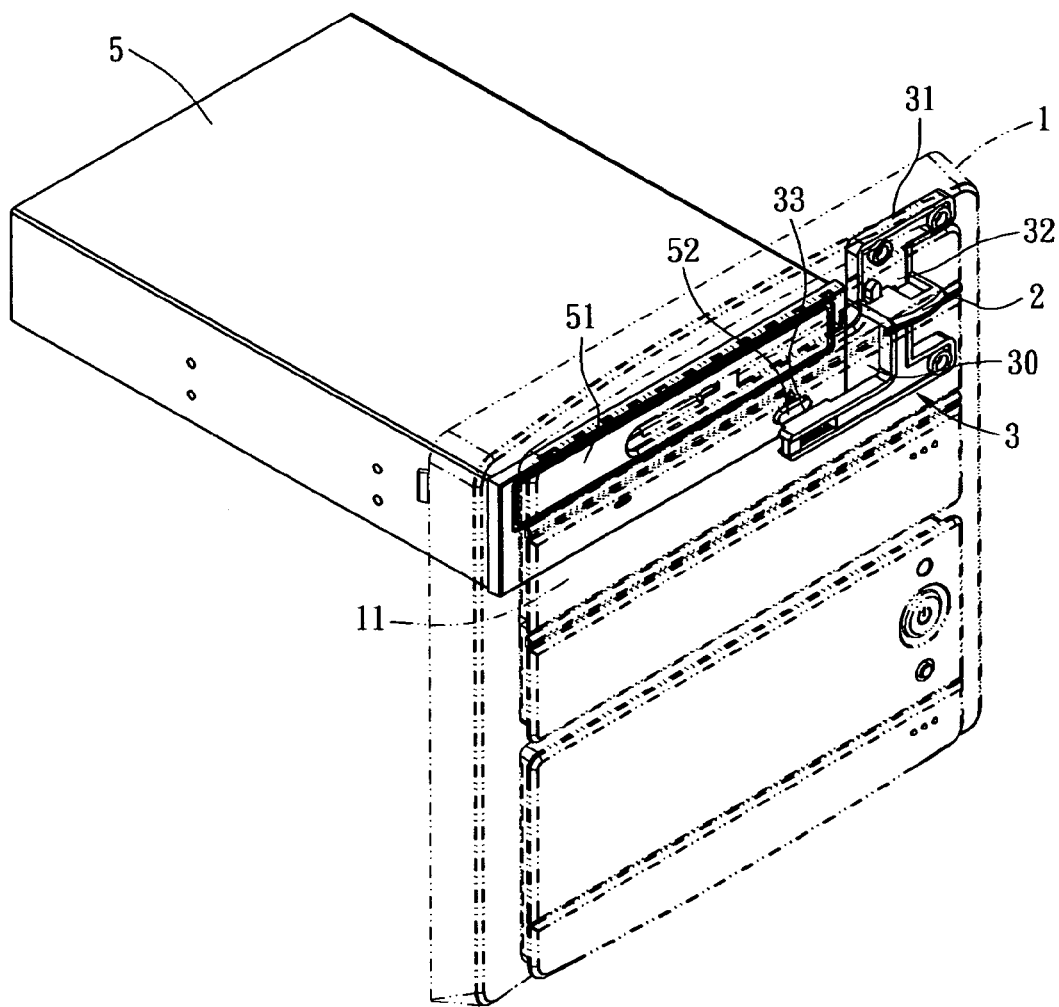
FIG. 4 is a diagram showing the peripheral equipment assembled with the computer casing panel according to one preferred embodiment of the present invention.

The operating button 2 is disposed on the panel 1 where is peripheral to the slot shutter 11. As shown in FIGS. 1–4, preferably, the operating button 2 is disposed at the lateral side of the slot shutter 11 or above the slot shutter 11 on the panel 1. As shown in FIG. 4, the operating button 2 is disposed at the position on the panel 1 where can be easily operated by the user. Compared with disposing the operating button 2 under the slot shutter 11 in the conventional art, disposing the operating button 2 at the lateral side of the slot shutter 11 or above the slot shutter 11 is much more convenient for the operating, where will not be affected or covered by the opened slot shutter 11.

The link component 3 provides an operational link between the operating button 2 and the tray controlling button 52, which is different from the direct compressing applied by the operating button 2 in the conventional art. The link component 3, as shown in the embodiment of FIG. 1, comprises a twisting arm 31 made of thermoplastic or other flexible strip-shaped material. The twisting arm 31 can be directly formed into an L-shaped structure by mold casting. Mainly, the L-shaped structure is to provide a space 30 adjacent to the twisting arm 31 so that the tray 51 of the multimedia equipment 5 can pass through the space 30 while sliding in and out, as shown in FIGS. 2 and 4. Therefore, the shape of the twisting arm 31 is not limited at all. As long as the shape does not affect the sliding in and out of the tray 51, any shape can be adopted as the twisting arm 31.

The resilient member 4, as shown in FIG. 1, corresponds to the pillar 12 disposed on the inner side of the panel 1 and is screwed together with the link component 3. As shown in FIG. 2, the link component 3 is flexibly screwed on the inner side of the panel 1 together with the resilient member 4. Through the resilient member 4, a flexible location shift is generated in response to the external force which presses the operating button. The link component 3 includes two extended ends, the first end and the second end. The first end is assembled correspondingly to the operating button 2 and is defined as the compressed end 32. The compressed end 32, as shown in FIGS. 3–4, is being compressed in response to the external force applied to the operating button 2. As a matter of fact, through the resilient member 4, a flexible resilience is generated in response to the external force applied to the operating button 2 so that the compressed end 32 of the link component 3 has a maintained resilience contrary to the direction of the external force applied to the operating button 2. The second end of the link component 3 is assembled correspondingly to the tray controlling button 52 of the multimedia equipment 5. Further, a compressing member 33 is fixedly disposed on the second end where corresponds to the tray controlling button 52. The compressing member 33 simultaneously operates in response to the external force applied to the operating button 2, as shown in FIGS. 3–5.

Figure 5:
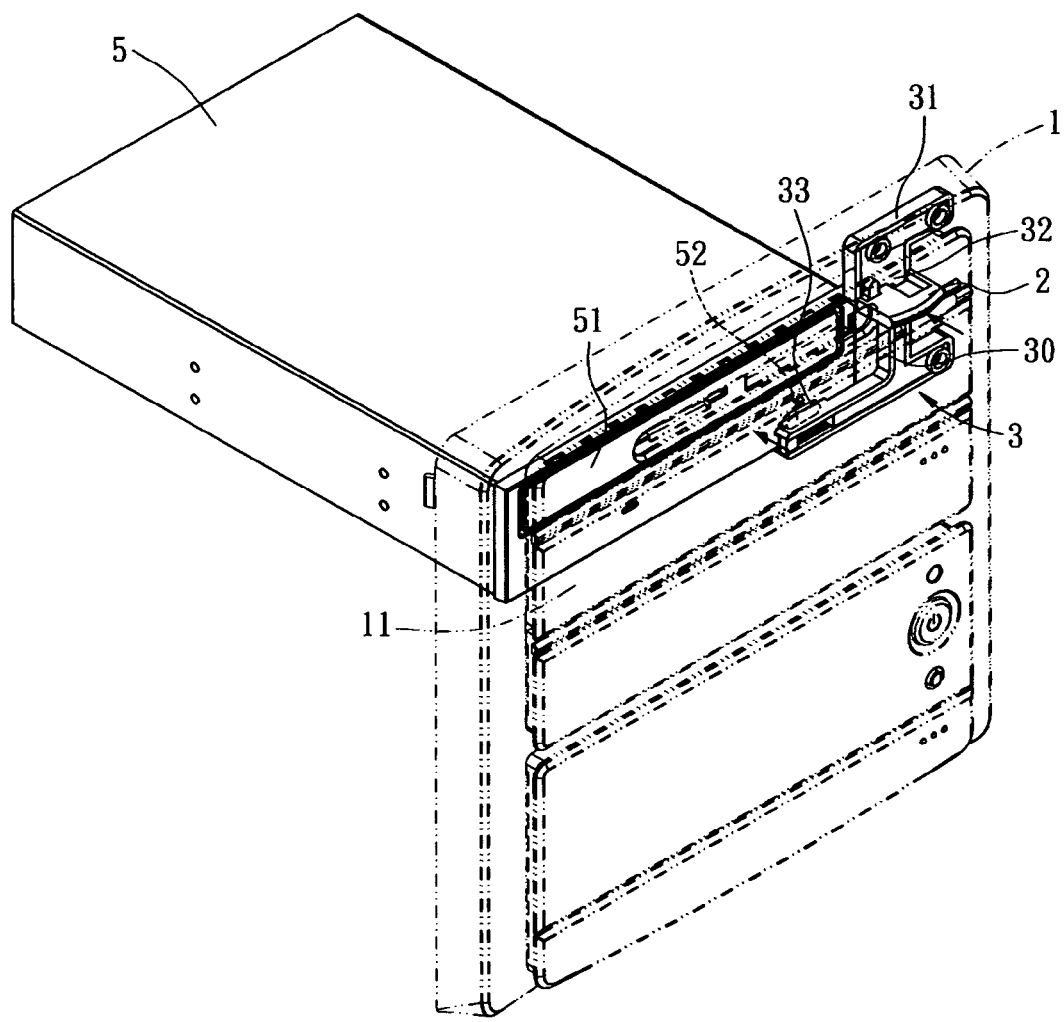
FIG. 5 is a diagram showing the operation through the operation button according to one preferred embodiment of the present invention.

The embodiment of the operating controlled by the controlling device for a slot shutter of a slot in a computer casing of the present invention is shown in FIGS. 2–5. The operating button 2 is disposed at the lateral side of the slot shutter 11 or above the slot shutter 11 on the panel 1, as shown in FIG. 4. Operating the operating button 2 is very easy and convenient either the tray 51 is at a sliding in or out status. When the user wants to operates the tray 51 to slide out, he can simply press the operating button 2. This external force will apply to the link component 3. And, a flexible deformation and location shift will be generated at the compressed end 32 of the link component 3 in response to the applied force. Next, this slight deformation and location shift will make the compressing member 33 to compress the tray controlling button 52 which corresponds to the compressing member 33, that drives the tray 51 slide out and the slot shutter 11 open simultaneously, as shown in FIG. 5. When the user wants to operates the tray 51 to slide in, similarly, he can simply press the operating button 2 which is disposed at a position not being covered by the slot shutter 11. While the operating button 2 is pressed again, the operating process will be generated as same as the above.

The compressing member 33 will compress the tray controlling button 52 in order to make the tray 51 to slide in. In the meantime, the slot shutter 11 shuts with the sliding-in tray 51.

Figure 6:
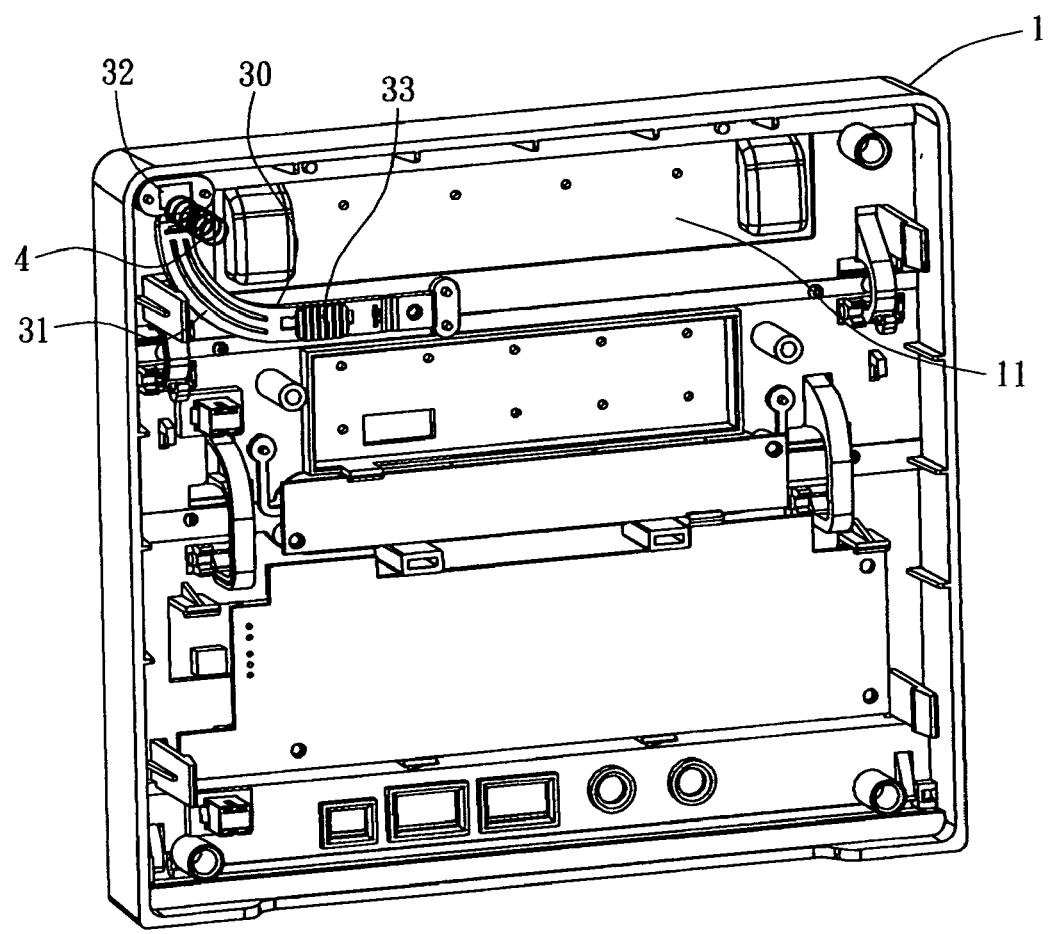
FIG. 6 is a diagram showing the link component assembled with the computer casing panel according to another preferred embodiment of the present invention.

Please refer to FIG. 6, which is a diagram showing the link component assembled with the computer casing panel according to another preferred embodiment of the present invention. Similar to what are disclosed in the above, the device includes a panel 1 with the slot shutter 11, an operating button 2 disposed on the panel 1 and adjacent to the slot shutter 11, a resilient member 4 for providing a resilience for the operating button 2, and a link component 3.

According to another aspect of the present invention, the link component 3 has a different shape that the twisting arm 31 thereof has a curvy shape. The twisting arm 31 has a single end disposed on the inner side of the panel 1. The link component 3 has a first end, the compressed end 32, corresponding to the operating button 2. One end of the resilient member 4 is situated against the inner side of the compressed end 32, while the other end of the resilient member 4 is situated against the multimedia equipment 5 or the computer casing 6. When an external force is applied to the operating button 2, a flexible resilience is generated in response to the external force applied to the operating button 2 so that the compressed end 32 of the link component 3 has a maintained resilience contrary to the direction of the external force applied to the operating button 2, as shown in FIG. 6. The link component 3 further has a second end corresponding to the tray controlling button 52 of the multimedia equipment 5. A compressing member 33 is fixedly disposed on the second end where corresponds to the tray controlling button 52. As such, a flexible location shift between the operating button 2 and the tray controlling button 52 can be linked through the link component 3 and the operating processes are linked as well. Particularly, the operating button 2 can be operated easily and conveniently, rather than being covered by the lot shutter 11.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A controlling device for controlling a slot shutter of a slot of a computer casing having a disk cartridge situated therein, the controlling device comprising:

a panel with the slot shutter; an operating button disposed on the panel and at a periphery of the slot shutter, for controlling the slot shutter;

a tray controlling button for controlling a tray of the disk cartridge;

a link component disposed at an inner side of the panel, having a first end corresponding to the operating button and a second end corresponding to the tray controlling button; and a resilient member to provide a resilience for the operating button;

thereby when the operating button is pressed, which renders the tray controlling button being compressed by the link component due to a flexibility of the link component, the tray of the disk cartridge can slide in and out.

2. The controlling device according to claim 1, wherein the operating button is disposed at a position on the panel above the slot shutter.

3. The controlling device according to claim 1, wherein the operating button is disposed at a position on the panel adjacent to the slot shutter.

4. The controlling device according to claim 1, wherein the link component comprises:

a twisting arm;

a first end assembled correspondingly to the operating button;

a second end assembled correspondingly to the tray controlling button; and a compressing member disposed on the second end for compressing the tray controlling button.

5. The controlling device according to claim 1, wherein the resilient member corresponds to a pillar disposed on the inner side of the panel and is screwed in the pillar together with the link component.

6. The controlling device according to claim 1, wherein two ends of the resilient member are situated against an inner side of the first end of the link component and the disk cartridge respectively.

7. The controlling device according to claim 1, wherein two ends of the resilient member are situated against an inner side of the first end of the link component and the computer casing respectively.

8. The controlling device according to claim 4, wherein the twisting arm has a flexible structure.

9. The controlling device according to claim 4, wherein the link component further comprises a space adjacent to the twisting arm for the tray passing therethrough when sliding in and out.

* * * * *